United States Patent Office 2,754,345
Patented July 10, 1956

2,754,345

CATALYTIC DEHYDROGENATION OF HYDROCARBONS

Isidor Kirshenbaum, Union, N. J., assignor to Esso Research and Engineering Company, a corporation of Delaware No Drawing. Application April 1, 1952,
Serial No. 279,950

7 Claims. (Cl. 260—683.3)

This invention is concerned with the production of $C_6+$ olefins from naphtha feed stocks containing $C_6+$ naphthenes and/or $C_6+$ paraffins, which ordinarily have a tendency to aromatize and cyclicize.

In accordance with the present invention, high concentrations of olefins have been produced from $C_6$ and higher paraffins, herein termed ($C_6+$), particularly from such paraffins mixed with $C_6$ and higher naphthenes by contacting these hydrocarbons in the vapor phase with certain catalyst compositions characterized by a major proportion of alumina, a minor proportion of chromia with small amounts of potassium compound in the presence of controlled amounts of water vapor and hydrogen gas.

Literature shows that alumina-chromia catalysts have been studied for catalytic dehydrogenations, mainly in the dehydrogenation of butanes and lower paraffins. This kind of catalyst was found useful in the dehydrogenation of these lower paraffins at elevated temperatures, above 1100° F., provided the paraffins contain no more than a very small amount of water vapor. U. S. Patent 2,131,089 teaches that no more than a fraction of a mole per cent of water vapor should be present in using a catalyst containing chromia with alumina to dehydrogenate butane.

In numerous studies made for finding a dehydrogenation catalyst suitable for dehydrogenating hexane and higher paraffins, another problem bound to arise is that the generally known dehydrogenation catalysts cause formation of aromatic hydrocarbons from the paraffins and naphthenes and relatively small amounts of olefins. One of the best catalysts for the production of aromatics is composed of alumina and chromia but this catalyst under normal dehydrogenating conditions forms aromatics and insignificant amounts of olefins from feeds such as hexanes, heptanes, etc.

It has now been found that a catalyst containing the alumina and chromia ingredients is greatly improved in its activity for preparing the desired higher olefins by the presence of a potassium compound promoter or like heavier alkali metal compounds and by using the catalyst in the presence of suitable amounts of water vapor and preferably with an added hydrogen-containing gas. The potassium compound suitable as a promoter is any potassium compound which, when calcined, forms, or is capable of forming, an oxide, such as potassium oxide, an oxide with alumina, chromia, or silica or of forming potassium carbonate. The like heavier alkali metal compounds include such compounds of heavier Group I metals, rubidium and cesium.

The potassium compound promoted catalyst should contain alumina as the major ingredient in the amount of 60 to 80 weight per cent, chromia as the minor ingredient in the amount of 20 to 40 weight per cent and the potassium compound in an amount of 1 to about 5%, preferably 1–3 wt. per cent, analyzed as potassia. With these three essential ingredients that catalyst may contain up to about 10% of silica, zirconium oxide, cerium oxide, manganese oxide, bismuth oxide, calcium oxide and zinc oxide as stabilizers and promoters. Other promoters which may be incorporated in the catalyst are platinum, palladium and beryllium oxide.

The catalyst may be prepared by coprecipitation of the aluminum and chromium oxides, by mixing sols of the oxides, or by impregnation of the alumina support, preferably a gel with a suitable water-soluble chromium compound, for example $CrO_3$, or a chromium compound decomposible to the oxide by heat. The chromium compound may also be incorporated by mulling or by dry mixing the alumina with a chromium compound such as $Cr_2O_3$. If desired, the composition may be dried prior to the addition of other constituents.

The potassium promoter may be incorporated in the catalytic material at the same time as the chromium oxide component or at any point prior to the final drying and calcining steps. The potassium is added by incorporating a suitable compound such as the hydroxide, nitrate, carbonate, acetate, chromate, dichromate and the like. If desired, potassium may be added to the composition by using potassium carbonate or hydroxide to precipitate a part or all of the aluminum support from a solution of an aluminum salt. If desired the other promoters and stabilizers may be added to the alumina-chromia-potassia catalyst. Especially good results are obtained if 2–7% $SiO_2$ is added to the catalyst. The additional promoters are suitably incorporated in the catalyst as a solution of a water-soluble salt, by mulling or by coprecipitation. The catalyst is dried and calcined, for example, by heating in air to a temperature of 950°–1300° F. The finished catalyst may be ground or pelleted. In the event that the catalyst is to be utilized in a reactor system involving the fluidized solids technique, the catalyst composition should be ground or prepared in such a way that the particles are below 300–500 microns and preferably are within the range of 10 to 200 microns with a major proportion of the particles in the 20 to 80 micron range.

The operating conditions for dehydrogenating $C_6+$ paraffins and naphthenes include the reaction temperature range of 750° to 1100° F., preferably 950° to 1050° F. at pressures of 0 to 50 p. s. i. g. Subatmospheric pressures or superatmospheric pressures up to 150 p. s. i. g. or even higher may be used. Time of contact is not critical in that times of contact and temperature are essentially interchangeable over a wide range. The time of contact may vary with the feed rate of 0.1 to 10 v./v./hr. (volumes of liquid feed per volume of catalyst per hour), preferably from 0.2 to 2.0 v./v./hr.

A proper dilution of the hydrocarbon feed with added water vapor or steam and hydrogen gas is important in obtaining high selectivity in formation of olefins, low selectivity to coke, and long activity of the catalyst. The added water vapor should be in the range of 1 to 25 mole per cent of the hydrocarbon vapor reactant, preferably 3 to 10 mole per cent thereof. The added hydrogen gas should be in range of 100 to 1000 mole per cent, that is, from 1 to 10 moles per mole of the hydrocarbon reactant. The hydrogen gas may be essentially pure or be a recycle gas containing 50–60% $H_2$. Hydrocarbons such as $CH_4$, $C_2H_6$ or even propane may be used in place of the hydrogen for feed stocks which do not form much coke.

The effect of the potassium compound promoter and water vapor is shown by the following data obtained in dehydrogenating a typical naphtha feed as shown in the following Example 1.

EXAMPLE 1

The feed stock contained about 30% methyl pentane, 47.5% n-hexane, 8% methylcyclopentane, 10% cyclohexane, 4% benzene, .5% dimethyl pentane. The feed stock was passed at a feed rate of .21 to 0.24 v./v./hr. over the alumina-chromia catalyst containing 22% $Cr_2O_3$ on 71% $Al_2O_3$ with about 4.5% $SiO_2$. Comparable runs were made in using the catalyst with and without a potassium compound promoter, the treatments being carried out at 1025°–1030° F. in 3 hour cycles. 2 moles of hydrogen were fed per mole of hydrocarbon into the reactor.

Table I
EFFECT OF WATER VAPOR AND POTASSIUM COMPOUND PROMOTER ON OLEFIN PRODUCTION

| | None | | 1.8 | |
|---|---|---|---|---|
| $K_2O$, wt. percent | | | | |
| $H_2O$ addition, mole percent on feed | 0 | 6 | 0 | 6 |
| Yields: | | | | |
| $C_6+$ olefins, vol. percent | 8.9 | 9.6 | 14 | 22 |
| Carbon, wt. percent | 15.7 | 14.2 | 3.6 | 3.7 |
| Aromatics, vol. percent | 27 | 24 | 43 | 23 |
| Selectivity, $\frac{}{C_6+\text{ olefins}}$ wt. percent | 11 | 12 | 16 | 31 |

The data given in Table I showed that the potassium compound promoter and the water vapor both contributed in obtaining the desired result, particularly a high yield of olefins rather than a high yield of aromatics.

In the typical results obtained, the selectivity in the formation of olefins was increased from 16 to 31% by the addition of steam when using the potassia promoted catalyst. In the absence of potassia the selectivity to olefins did not exceed 12%. This high selective conversion to olefins is higher than has heretofore been obtained in catalytic dehydrogenation of $C_6+$ paraffins and naphthenes.

EXAMPLE 2

To ascertain optimum water vapor dilution, a series of experiments were carried out in which the proportion of water vapor was varied. Representative data is shown in the following Table II.

Table II
EFFECT OF WATER ON OLEFIN PRODUCTION

[Conditions: 1025°–1030° F., 0 p. s. i. g., 0.24 v./v./hr., 2/1 $H_2/HC$ mole ratio. Catalyst: 71% $Al_2O_3$, 22% $Cr_2O_3$, 1.8% $K_2O$, 4.5% $SiO_2$, .7% $CeO_3$.]

| Mole percent $H_2O$ on Feed | None | 1.15% | 6.2% |
|---|---|---|---|
| Yield, on feed: | | | |
| $C_6+$ Olefins,[1] vol. percent | 14 | 19 | 22 |
| Carbon, wt. percent | 3.6 | 3.5 | 3.7 |
| Aromatics, vol. percent | 43 | 33 | 23 |

[1] May contain about 1% $C_4$ and $C_5$ olefins.

It is shown by the data in Table II that the desired high level of selective conversion to olefins starts with addition of about 1 mole % water from the hydrocarbon feed and increases with increased proportions of water.

An interesting observation was made in treating substantially pure naphthenes, such as methylcyclopentane, with the potassium compound promoted chromia on alumina catalyst. Methylcyclopentane has been notoriously difficult to dehydrogenate on account of its carbon-forming tendencies, especially at the elevated temperatures hitherto found necessary even with catalytic dehydrogenation of the methylcyclopentane. Passing 99% pure methylcyclopentane over the catalyst containing about 1.8% $K_2O$ with 22% $Cr_2O_3$ and 71% $Al_2O_3$ as in Examples 1 and 2, at temperatures of 1020° F., 0 p. s. i. g. with 5.2 mole % water vapor and 3 moles of hydrogen per mole of the hydrocarbon, a surprisingly high conversion to olefinic hydrocarbons was obtained. The feed rate was .7 v./v./hr. The main product obtained was methylcyclopentadiene at a selectivity of about 30% and nearly 16% selectivity in the formation of methylcyclopentene was obtained but with a formation of about 3% aromatics. This data indicated that the catalyst was exceptionally useful in treating the naphthene, per se, for making cyclic dienes, or mixed naphthene-paraffin feed stocks to produce good yield of the $C_6$ and higher olefins.

Somewhat peculiarly, tests have shown that even under optimum conditions the normal paraffins by themselves in the presence of the potassium compound promoted alumina catalyst and in the presence of added water vapor and hydrogen do not form as much of the desired olefins as when the paraffins are mixed with the naphthenes. For example, in treating n-hexane the proportion of olefins formed was substantially increased by the presence of the potassium compound promoter and the water vapor but fell short of the amount of olefins obtained with the naphtha mixtures of hexanes and $C_6$ naphthenes. It was also shown that for satisfactory yields of olefins the feed hydrocarbons should be a mixture containing paraffins with a substantial amount of naphthenes, preferably with the paraffins in preponderance, e. g., 70 to 90 volume percent paraffins and 10–30 volume percent naphthenes, on an aromatic-free basis. The presence of aromatics does not interfere with the process of this invention and under some circumstances actually is beneficial. Naphthenes, such as the cyclopentanes, by themselves tend to form mainly diolefins as shown in Example II.

Having described the invention, it is claimed as follows:

1. The process of dehydrogenating a paraffin having at least 6 carbon atoms per molecule to form olefins preferentially which comprises diluting the paraffin in vapor phase with 1 to 25 mole percent water vapor, contacting the thus diluted paraffin vapor with a catalyst containing on a weight basis 60 to 80% alumina, 20 to 40% chromia and 1 to 5% of a potassium compound calculated as $K_2O$, maintaining the diluted hydrocarbon vapor at a temperature of 950° to 1050° F. as it is contacted with said catalyst.

2. The process of producing $C_6$ olefins which comprises diluting a vapor mixture of a $C_6$ paraffin and a $C_6$ naphthene with 3 to 10 mole per cent water vapor, passing said mixture with the water vapor into contact with a catalyst containing on a weight basis essentially 60 to 80% alumina, 20 to 40% chromia, and 1 to 5% of a potassium compound determined as $K_2O$ and maintaining the mixture at 950° to 1050° F. as it is contacted with said catalyst.

3. The process as defined in claim 2, wherein one to ten moles of hydrogen gas is added to the vapor mixture per mole of hydrocarbons present therein.

4. The process of forming diolefins and olefins preferentially, which comprises diluting methylcyclopentane vapor with water vapor and with hydrogen, and contacting the diluted methylcyclopentane vapor with a catalyst containing on the weight basis 60 to 80% alumina, 20 to 40% chromia, and 1 to 5% potassium compound determined as $K_2O$ at 750° to 1100° F.

5. The process of enhancing yields of olefins from a naphtha fraction containing paraffins of 6 and more carbon atoms per molecule which comprises adding to said paraffins a sufficient amount of a naphthene having at least 6 carbon atoms per molecule to provide a hydrocarbon mixture containing at least 10 and up to 30 volume percent naphthenes on an aromatic-free basis, diluting the paraffin and naphthene mixture with 3 to 10 mole percent water and 100 to 1000 mole percent hydrogen based on the hydrocarbon reactants, and contacting the resulting diluted mixture at 750 to 1100° F. and a pressure of 0 to 50 p. s. i. g. with a catalyst which had been calcined in air at a temperature of about 950 to 1300° F. and contains, on a weight basis, 60 to 80% alumina, 20 to 40% chromia, 2 to 7% silica, and 1 to 5% of a compound of an alkali metal which becomes an oxide or carbonate on calcining.

6. The process of dehydrogenating a hydrocarbon feed containing about 70 to 90 parts by volume of hexanes and about 30 to 10 parts by volume of cyclohexane which comprises mixing said feed with 3 to 10 mole percent water and 100 to 1000 mole percent hydrogen based on said hydrocarbon feed and passing the resulting mixture at a temperature of 950 to 1050° F. at substantially atmospheric pressure over a catalyst which had been calcined in air at a temperature of 950 to 1300° F. and, on a weight basis, consists essentially of about 60 to 80% alumina, 20 to 40% chromia, 2 to 7% silica, and about 1 to 5% of a potassium compound analyzed as potassia.

7. The process of dehydrogenating a hydrocarbon feed consisting essentially of about 30% methyl pentane, 47.5% n-hexane, 8% methylcyclopentane, 10% cyclohexane, 4% benzene, and 0.5% dimethylpentane which comprises mixing said feed with about 6 mole percent water and 200 mole percent hydrogen based on said feed and passing the resulting mixture at a temperature of about 1025 to 1030° F., at atmospheric pressure and at a rate at about 0.21 to 0.24 liquid volumes of hydrocarbon per volume of catalyst per hour over a catalyst calcined in air at a temperature of about 950 to 1300° F. and consisting essentially of about 71% $Al_2O_3$, 22% $Cr_2O_3$, 4.5% $SiO_2$, 1.8% $K_2O$, and 0.7% $Ce_2O_3$ on a weight basis.

References Cited in the file of this patent
UNITED STATES PATENTS

| | | |
|---|---|---|
| 2,172,534 | Grosse et al. | Sept. 12, 1939 |
| 2,249,337 | Visser et al. | July 15, 1941 |
| 2,335,550 | Sturgeon | Nov. 30, 1943 |
| 2,351,094 | Blaker | June 13, 1944 |
| 2,397,352 | Hemminger | Mar. 26, 1946 |
| 2,408,146 | Kearby | Sept. 24, 1946 |
| 2,420,563 | Reynolds et al. | May 13, 1947 |